Patented Jan. 7, 1947

2,414,074

UNITED STATES PATENT OFFICE 2,414,074

ANTIFOGGING COMPOSITION

Emil A. Vitalis, East Port Chester, Conn., assignor to American Cyanamid Company, New York, N. Y., a corporation of Maine No Drawing. Application December 14, 1943, Serial No. 514,297

6 Claims. (Cl. 106—13)

This invention relates to anti-fogging agents for transparent surfaces such as glass or the transparent resins such as methyl methacrylate used in the windshields of automobiles, airplanes, etc. and in optical instruments. A principal object of the invention is the provision of an anti-fogging agent that is more permanent than those that have previously been used, and which will therefore maintain its effectiveness for longer periods of time. The invention will be described with particular reference to military uses, but it should be understood that the advantages thereof are also important for other purposes and can be obtained whenever it is desired to maintain a transparent surface free from fog or condensed moisture under changing conditions of temperature or humidity.

An anti-fogging material is required at the present time to maintain the line of sight free from fog on transparent solid surfaces of airplanes. Thus, for example, during the flight of a dive bomber from an altitude of about 8,000 feet (temperature about 32° F.) to sea level, the sudden change in temperature and relative humidity of the air results in a condensation of moisture on the windshield and also on the lenses of the bomb-sight, and this seriously interferes with the effectiveness of the attack. The principal loci of fog are on the surfaces of the aviator's goggles and on the external and internal surfaces of the lenses in the telescope. An anti-fogging agent must not only function during the dive, but it must also continue to function in flight and after the optical equipment has been stored on the ground, and the hot, humid atmosphere of the South Pacific and other tropical combat areas causes this problem to be particularly severe.

A successful anti-fogging agent must possess surface-active properties; i. e., it must contain an organic hydrophobic radical together with a hydrophilic group that will cause it to take up the water droplets that condense as fog and thus maintain a clear transparent film. However, the great majority of commercial wetting agents possess rather poor anti-fogging properties because of their excessive water-solubility, which causes them to be dissolved in the condensed moisture. In accordance with the present invention the excessive water solubility of the most effective surface-active agents is overcome by the addition of a water-immiscible solvent for the wetting agent which will function to reduce its solubility in water and thus to retain the wetting agent in the film formed on the glass or other surface to be protected against fogging.

In addition to anti-fogging agents containing as the only principal anti-fogging agent a wetting or surface-active agent together with a water insoluble solvent therefor, the invention also includes compositions of this type which also contain a water-soluble adhesive capable of promoting adhesion of the film to the glass or other transparent material, such adhesive being selected from the class consisting of water-soluble starches and gums. For example, water-soluble gums such as gum tragacanth, Irish moss and the like, may be employed. Likewise, citrus pectin, apple pectin and other similar water-soluble adhesives may be used. Further, water-soluble or alkali solubilized corn starch and similar starches including wheat starch may be employed.

Although any wetting agent may be used in conjunction with water-insoluble solvents to produce anti-fogging compositions in accordance with the present invention I greatly prefer those wetting agents which are soluble in hydrocarbons of low vapor pressure, such as high boiling petroleum hydrocarbons. The most effective agents for this purpose of which I am aware are the surface-active esters of organic sulfopolycarboxylic acids such as the dibutyl, diamyl and dihexyl esters of sulfophthalic acid, the diamyl, dihexyl, dioctyl and didecyl esters of sulfosuccinic acid and the tributyl, triamyl and trihexyl esters of sulfotricarbalyllic acid. These and similar sulfonated compounds are preferably used in the form of their sodium, ammonium, or other water-soluble salts. Other oil-soluble wetting agents that may be used are sodium or ammonium alkyl aryl sulfonates (sold commercially as "Nacconol"), alkylated aryl sulfonates (sold as "Santomerse") alkyl phenylene sodium sulfonates (sold as "Invadine B"), the compound $C_{17}H_{33}CON-CH_3C_2H_4SO_3Na$, which is the stearyl amide of methyl taurine (sold as "Igepon T") and the sodium sulfonate of oleic acid ester of aliphatic compound (sold as "Igepon AP"). It should be mentioned, however, that many of these wetting agents in their commercially available forms contain inorganic salts such as sodium sulfate which should be removed before they are used for the purposes of the present invention.

Any water-insoluble high-boiling solvent for the wetting agents may be employed. The solvent or mixture of solvents may be high-boiling liquids at ordinary temperatures, such as dimethyl or di-butyl phthalates, or semi-solids such as lecithin, but I greatly prefer to employ low vapor pressure hydrocarbon solvents such as petroleum waxes and the like. Thus, for example, the petroleum jelly known commercially as "Vaseline" produces excellent results and can be used as a solvent for any of the wetting agents listed above, and water-insoluble aliphatic hydrocarbons of low vapor pressure therefore constitute the preferred solvent for use in practicing the invention.

Ordinarily it is not necessary to employ a large quantity of the water-insoluble solvent, even as compared with the quantity of wetting agent used. For most purposes about 5-25% of petroleum jelly or other water-insoluble solvent should be employed, based on the weight of the wetting agent. The quantity of wetting agent, in turn, is ordinarily only about 5 to 20% of the entire weight of the complete anti-fogging composition, from which it is apparent that only very small quantities of the organic solvent need be employed. However, even these small quantities will produce a remarkable improvement in the permanency of the composition as a whole.

From the foregoing description it is evident that the essential ingredients of my improved anti-fogging composition are a wetting agent, which is preferably of the oil-soluble type, and a high boiling water-insoluble solvent therefor. These may be applied as such or they may first be converted into an aqueous paste by dissolving the wetting agent in water and emulsifying the water-insoluble solvent in the aqueous solution. It will be understood that in the latter case the water and any other volatile material is quickly evaporated from such pastes when they are exposed in thin films, leaving the wetting agent and its solvent as a mutual solution of low water-solubility but having excellent anti-fogging properties.

In addition to the wetting or surface-active agent and the water-insoluble solvent therefor, the finished composition may also contain about 1-5% of its total weight in the form of a water-soluble adhesive of the type described above. Gum tragacanth is preferred for this purpose, although any other water-soluble adhesive may be employed. In frigid climates the composition may also contain an anti-freeze such as glycerine, ethylene glycol or other water-soluble compound capable of reducing the freezing point, as well as small amounts of a preservative such as phenyl mercuric acetate and a dyestuff if desired. Dyes, preservatives and anti-freezes are well known ingredients of anti-fogging compositions, and are not claimed as a part of the present invention.

The invention will be illustrated in greater detail by the following specific examples. It should be understod, however, that although preferred embodiments of the invention may be described in these examples they are given primarily for purposes of illustration and the invention in its broader aspects is not limited thereto.

Example I

A water solution of sodium dioctyl sulfosuccinate was prepared by adding 9.4 parts by weight of 85% of sodium dioctyl sulfosuccinate to 86.6 parts by weight of water heated to 180° F. and stirring to complete solution. 2 parts by weight of gum tragacanth were dissolved in an equal weight of isopropanol and added to the water solution. The latter was then cooled to about 140° F. with continual stirring. 2 parts by weight of "Vaseline" were melted, heated to 140° F. and poured into the solution with stirring. This resulted in an extremely fine emulsion. Upon cooling the product was obtained as a soft paste which could be readily diluted with water.

A sample of the product was applied to glass as a thin film by means of a wet cloth. Upon polishing with a dry cloth the film was clear and totally invisible, but the glass remained resistant to fogging even after it had been heated in an oven at 100° F. and 90% relative humidity for several hours.

Example 2

A solution of 8 parts by weight of sodium dioctyl sulfosuccinate in 90 parts of water was prepared at 180° F. as described in Example 1 and cooled to 140° F. 2 parts of "Vaseline" were then melted, heated to 140° F. and added to the wetting agent solution with strong agitation. The resulting dispersion was cooled and formed a paste similar to the product of Example 1. It was found to possess excellent anti-fog properties when applied to glass. The film retained its anti-fogging properties even after the treated glass had been heated in an oven at 100° F. and 90% relative humidity for several hours.

Example 3

A composition similar to that of Example 1 but containing corn starch was prepared with the following composition, the parts being by weight:

| | Percent |
|---|---|
| Sodium dioctyl sulfosuccinate | 8 |
| Pearl starch | 4 |
| Ethylene glycol | 20 |
| Petroleum jelly | 2 |
| Water | balance |

The starch was boiled in the water for ½ hour. The wetting agent was dissolved in the ethylene glycol and added to the hot starch-water solution which was then cooled to 140° F. The petroleum jelly was melted and added at this temperature with agitation, after which the product was cooled to a thin paste.

The composition possessed good permanency and anti-fogging properties when tested as described in Examples 1 and 2.

What I claim is:

1. An anti-fogging composition comprising a surface-active ester of a sulfopolycarboxylic acid together with 5-25% of a petroleum jelly, based on the weight of said ester.

2. An anti-fogging composition comprising a surface-active ester of an aliphatic sulfopolycarboxylic acid together with 5-25% of a petroleum jelly, based on the weight of said ester.

3. An anti-fogging composition comprising a surface-active ester of sulfosuccinic acid together with 5-25% of a petroleum jelly, based on the weight of said ester.

4. An anti-fogging composition comprising 5-20% by weight of a surface-active ester of a sulfopolycarboxylic acid, 0.25-5% of a petroleum jelly, and 1-5% of a water-soluble adhesive selected from the class consisting of water-soluble starches and gums.

5. An anti-fogging composition comprising 5-20% by weight of a surface-active ester of an aliphatic sulfopolycarboxylic acid, 0.25-5% of a petroleum jelly, and 1-50% of a water-soluble starch.

6. An anti-fogging composition comprising 5-20% by weight of a surface-active ester of sulfosuccinic acid, 0.25-5% of a petroleum jelly, and 1-5% of a water-soluble starch.

EMIL A. VITALIS.